Aug. 22, 1967

C. M. LEAR 3,337,680

SEALING MEANS FOR ENCLOSED BUS STRUCTURES

Filed March 29, 1965

WITNESSES
Theodore F. Wrobel
James F. Young

INVENTOR
Charles M. Lear
BY
Clement L. McHale
ATTORNEY

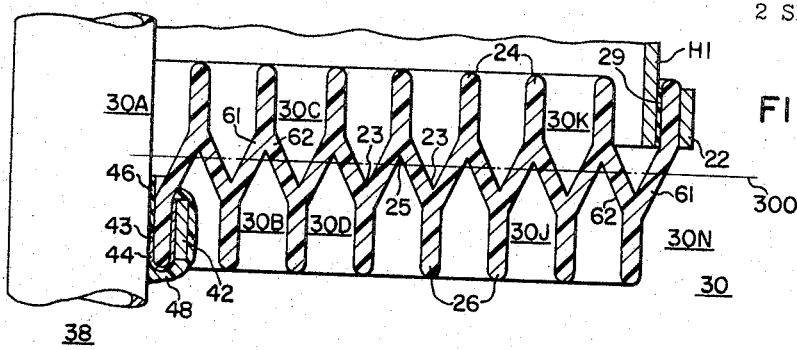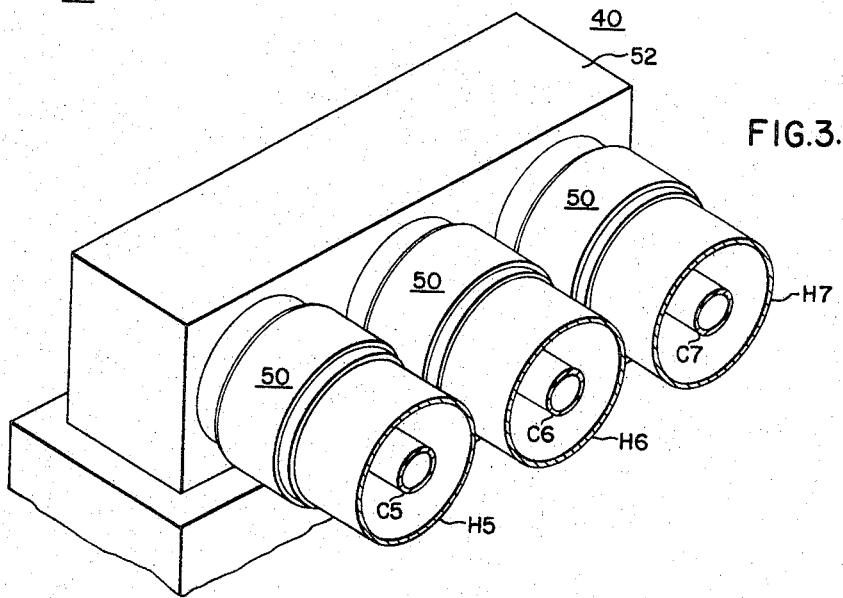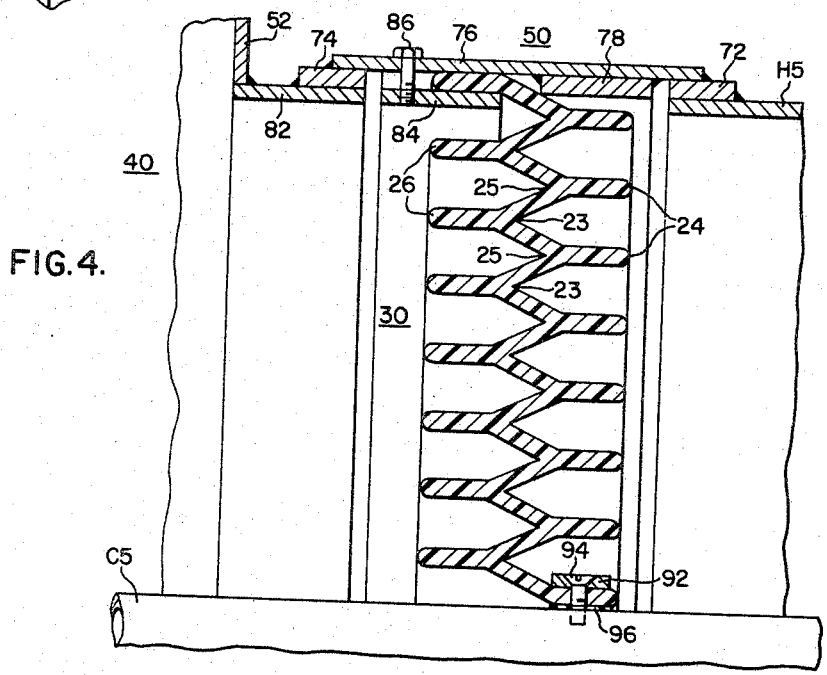

United States Patent Office 3,337,680
Patented Aug. 22, 1967

3,337,680
SEALING MEANS FOR ENCLOSED
BUS STRUCTURES
Charles M. Lear, Washington, Pa., assignor to Westinghouse Electric Corporation, Pittsburgh, Pa., a corporation of Pennsylvania
Filed Mar. 29, 1965, Ser. No. 443,360
8 Claims. (Cl. 174—75)

ABSTRACT OF THE DISCLOSURE

This invention relates to enclosed bus structures and more particularly to a sealing means adapted for use with enclosed bus structures.

More specifically, this invention relates to a high voltage bus structure in which an elongated high voltage bus conductor is disposed inside a tubular metallic housing formed from an electrically conducting material. A resilient sealing member or partition member of electrically insulating material is provided which extends between the bus conductor and the housing to seal off the space on one side of the sealing member from the space on the other side of the sealing member which may be outside the housing. The sealing member includes an opening at its inner periphery which is secured to the bus conductor and an outer periphery which is secured to the housing. The sealing member is generally zig-zag in cross-section and includes a plurality of spaced vertices alternately projecting in opposite directions generally parallel to the bus conductor and an elongated integral portion projecting away from each vertex generally parallel to the bus conductor to increase the insulating creepage distance between the bus conductor and the housing.

In the application of high voltage enclosed bus structures, such as those of the isolated phase type, it is sometimes necessary or advisable to provide some means for sealing off the space inside the housing or enclosure of the bus structure from the space inside the housing or enclosure of the associated electrical apparatus such as a generator, a transformer, or a circuit breaker, to which the bus structure is electrically and structually connected. For example, if an insulating fluid such as air is disposed between each conductor and its associated housing in an enclosed bus structure which is electrically connected to the terminals of a hydrogen cooled generator, the space inside each housing of the bus structure should be sealed off from the space adjacent to the generator terminals to prevent the introduction of any hydrogen which may inadvertently leak from the generator into the enclosed bus structure. In other applications, it is necessary to close off the end of a housing in an enclosed bus structure in order to seal off the space inside the housing from external atmospheric conditions at the point where a bus conductor enters or leaves the housing to form an electrical connection between the bus structure and an associated apparatus, such as a circuit breaker or a transformer. Certain problems also arise in providing sealing means for enclosed bus structures of the type described due to the thermal expansion and contraction of different portions of each bus conductor and its associated housing during the operation of such equipment along with certain bending or other movements which may occur in the bus conductor and its associated housing, as well as in the housing and conductors of the associated electrical apparatus to which the bus structure is electrically connected. It is therefore desirable to provide an improved sealing means or diaphragm to seal off an enclosed bus structure from an associated electrical apparatus, to seal off different portions of an enclosed bus structure from each other or to seal off an enclosed bus structure from external atmospheric conditions.

It is an object to provide a new and improved bus structure of the enclosed type.

Another object of this invention is to provide an improved sealing means for enclosed bus structures.

A further object of this invention is to provide an improved flexible diaphragm or partition member, particularly adapted for use in enclosed bus structures.

A more specific object of this invention is to provide an improved resilient diaphragm which maintains a predetermined electrical insulating creepage path across the diaphragm as the diaphragm flexes or deforms.

Other objects will, in part, be obvious and will, in part, appear hereinafter.

For a fuller understanding of the nature and objects of the invention, reference should be had to the following detailed description taken in connection with the accompanying drawings, in which:

FIG. 2 is an enlarged view, partly in side elevation and partly in section, of a portion of a sealing means utilized in the bus structure shown in FIG. 1;

FIG. 3 is an isometric view of a three-phase bus structure embodying the principal features of the invention in an alternate construction; and FIG. 4 is an enlarged view, partly in side elevation and partly in section, of a portion of the structure shown in FIG. 3.

Figure 1:
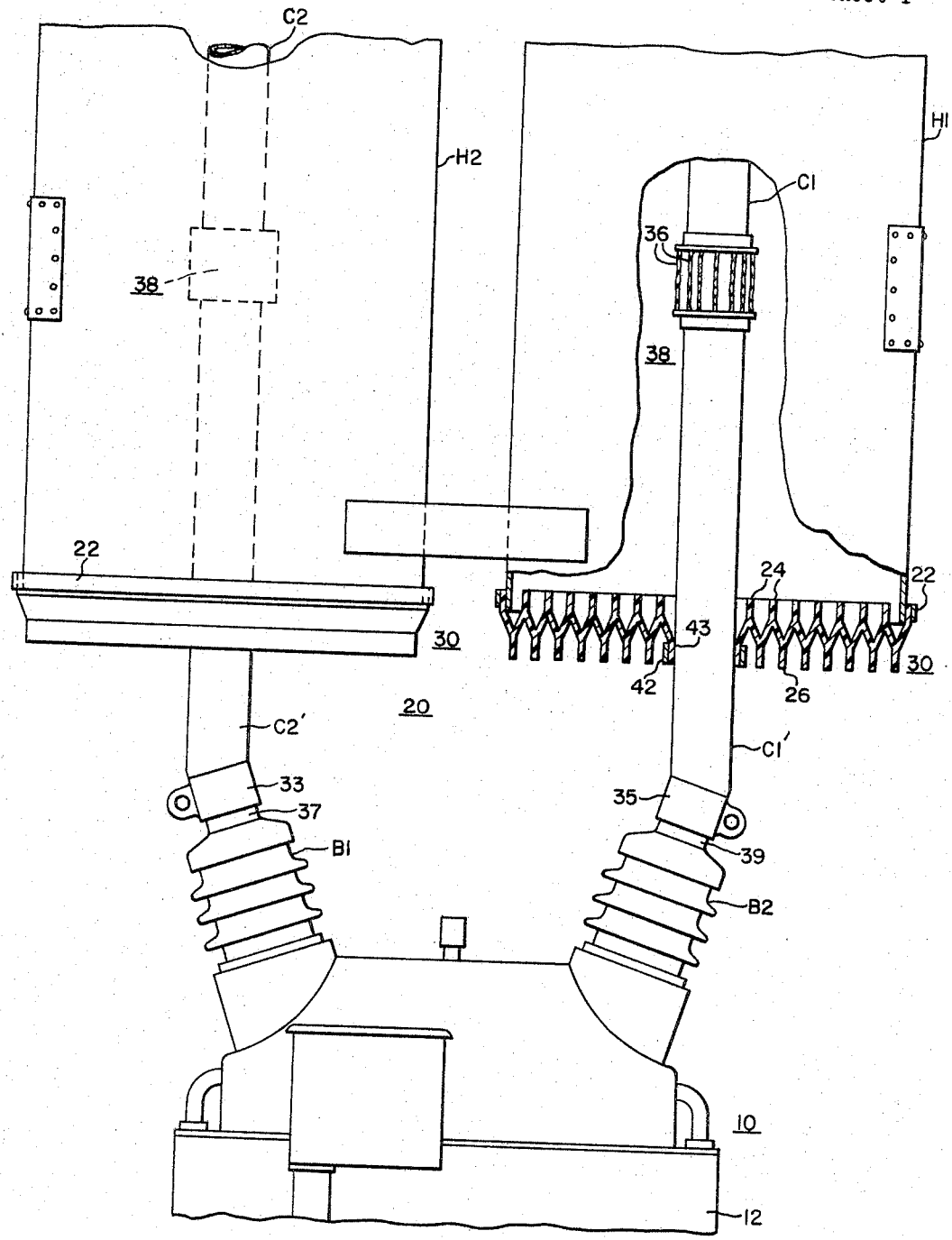
FIGURE 1 is a side elevational view, partly in section, of an isolated phase bus structure embodying the principal features of the invention.

Referring now to the drawings and FIGS. 1 and 2 in particular, there is illustrated an isolated phase bus structure 20 which may be employed to electrically interconnect an electrical apparatus such as a circuit breaker, as indicated at 10 and another electrical apparatus such as a generator (not shown) or a transformer (not shown) or a source of electric power. The bus structure 20 as illustrated comprises the laterally spaced bus conductors C1 and C2 and the associated housings H1 and H2 for enclosing the bus conductors C1 and C2, respectively. The conductors C1 and C2 are supported within the associated housings by suitable supporting means, such as the spaced insulating supports or insulators (not shown), such as described in detail in copending application Ser. No. 407,347, filed Oct. 29, 1964, by Arthur B. Niemoller which is assigned to the same assignee as the present application. It should be noted that the space between each of the conductors C1 and C2 and its associated housing is substantially filled with a suitable insulating fluid, such as air or other insulating gas. The housings H1 and H2 are preferably formed from a suitable non-magnetic, electrically conducting material such as aluminum, in order to magnetically shield magnetic fluxes which are produced when current flows in the conductors C1 and C2, to ensure the safety of operating personnel, and to prevent the occurrence of a line-to-line or a phase-to-phase fault condition when a three-phase bus structure employing an additional conductor and an associated housing (not shown) is employed.

The circuit breaker 10 comprises a metallic housing or tank 12 which is normally maintained at ground or zero potential and the first and second rigid terminal conductors 37, 39 which are insulated from the housing 12 by means of the insulating bushings B1 and B2, respectively. The terminal conductor 39 of the circuit breaker 10 is electrically connected to a rigid bus conductor C1' which forms part of the bus structure 20 by a terminal connector 35. The rigid bus conductor C1' passes into the housing H1 through a sealing member 30, as will be explained hereinafter, and is electrically connected to the bus conductor C1 by a flexible conducting joint 38 that is disposed inside the housing H1, as shown in FIG. 1. The flexible conducting joint 38 comprises a plurality of spaced flexible conducting braids or members 36 which electrically connect the adjacent ends of the bus conductors C1 and C1′. Similarly, the terminal conductor 37 is electrically connected to the rigid bus conductor C2′ by the terminal connector 33. The rigid bus conductor C2′ also passes into the housing H2 through a sealing member 30 and is electrically connected to the bus conductor C2 by a flexible conducting joint (not shown) similar to the flexible conducting joint 38 previously described. The flexible joints between the bus conductors C1′ and C2′ and the associated bus conductors C1 and C2, respectively, are provided to substantially prevent any mechanical forces or vibration which result during the operation of an electrical apparatus, such as the circuit breaker 10, from being transmitted to the bus structure 20 through the bus conductors of said bus structure.

In order to seal off the space between the bus conductors C1 and C1′ and the associated housing H1 inside the housing H1 and to seal off the space between the bus conductors C2 and C2′ and the associated housing H2 inside the housing H2 from external atmospheric conditions and, more specifically, to prevent the entrance of moisture, dirt and other contaminating materials into each of the housings H1 and H2, a sealing member 30 is disposed at the end of each of the housings H1 and H2 and hermetically seals off the spaces between the conductors C1′ and C2′ and the associated housings H1 and H2, respectively, from external atmospheric conditions.

More specifically, the sealing member of flexible diaphragm 30, as shown in FIG. 2, includes a central opening 43 through which the bus conductor C1′ passes with the inner periphery of the sealing member 30 being rigidly secured to the bus conductor C1′ and the outer periphery of the sealing member 30, which is circular in overall configuration as illustrated, rigidly secured to the end of the housing H1. The sealing member 30 is formed from an electrically insulating material preferably having a predetermined degree of resilience or stiffness to permit the flexing of the sealing member 30 during the operation of the bus structure 20 and to permit limited thermal expansion and contraction of the bus conductor C1′ or the housing H1 relative to one another. One suitable material which has been found to be particularly advantageous is silicone rubber. The sealing member 30 lies generally in a predetermined plane which is substantially perpendicular to the bus conductor C1′ and extends radially outwardly from the bus conductor C1′ to the housing H1. The cross-section of the central portion of the sealing member 30 is generally sawtooth or zig-zag in configuration, as shown in FIG. 2, and includes a plurality of substantially coaxial or concentric portions 30A through 30N which alternately project axially in opposite directions from a reference plane. Each of the coaxial or concentric portions 30A through 30N is generally V-shaped in cross-section and includes first and second planar portions 61 and 62, respectively, which intersect or meet at an angle with the vertices 23 and 25 of the successive interconnected coaxial portions being disposed on opposite sides of a reference plane which passes through the central portion of the sealing member 30 as indicated at 300 in FIG. 2. The sealing member 30 also includes a plurality of elongated coaxial or concentric portions 24 and 26 which project axially away from the reference plane of the central portion 30 just described or away from the vertices of the coaxial portions of the central portion of the sealing member 30 with the successive projecting portions 24 and 26 alternately projecting in opposite directions on opposite sides of the reference plane indicated. It is to be noted that the projecting portions 24 and 26 are substantially parallel to one another and to the bus conductor C1′ and will remain substantially parallel as the sealing member 30 flexes or changes shape and the angles, at which the planar portions meet each of the associated coaxial portions of the central portion of the sealing member 30, varying during the operation of the bus structure 20.

The inner periphery of the sealing member 30 is rigidly secured to the bus conductor C1′ by a clamping ring or band 42 which is preferably formed from a nonmagnetic material, such as aluminum or stainless steel to avoid hysteresis losses and reduce eddy current losses. In order to avoid a potential difference between the clamping band or ring 42 and the adjacent bus conductor C1′ which is normally maintained at a relatively high potential, such as 15 kv. or 23 kv., the clamping band 42 is electrically connected to the adjacent bus conductor C1′ by a conductor 44 which may be formed as a conductor which is sprayed on the inner end of the sealing member 30 or provided as a separate conducting strap which is secured to the bus conductor C1′ and the band 42. The inner periphery of the sealing member 30 may also be sealed or bonded to the bus conductor C1′ by a suitable bonding or sealing compound as indicated at 46 in FIG. 2, such as a silicone rubber spray coating. The electrical connection between the clamping band 42 and the bus conductor C1′ avoids the possibility of a corona discharge or flashover due to the capacitance which would otherwise result between the bus conductor C1′ and the clamping ring or band 42 and the concentration of potential stress at any sharp corners or edges of the clamping band 42. Similarly, the outer periphery of the sealing member 30 is secured to the housing H1 by a clamping ring or band 22 with the outer periphery of the sealing member 30 being sealed or bonded to the housing H1 by a similar bonding or sealing material, such as a silicone rubber compound, as indicated at 29 in FIG. 2.

In the operation of the bus structure 20, it is important to note that the sealing member 30 provides a predetermined electrical insulating creepage distance between the bus conductor C1′ and the associated housing H1 which is maintained at substantially a predetermined value during thermal changes in the housing H1 and the bus conductor C1′ as the included angle in each of the coaxial portions of the sealing member 30 varies to avoid the possibility of an insulating flashover between the bus conductor C1′ and the housing H1. The sealing member 30 also prevents the transmission of mechanical forces or vibrations which originate with the electrical apparatus to which the bus structure 20 is electrically connected, such as may result during the interrupting operation of the circuit breaker 10. As previously mentioned, since the projecting portions 24 and 26 of the sealing member 30 remain substantially parallel during the operation of the bus structure 20, an insulating creepage distance of approximately three times the distance between the bus conductor C1′ and its associated housing H1 may be obtained and maintained during the operation of the bus structure 20. It is also to be noted that as the sealing member 30 flexes or deforms resiliently during the operation of the bus structure 20, a limited degree of bending movement of the bus conductor C1′ with respect to the housing H1 would also be permitted by the sealing member 30. Since the construction of the sealing member 30 mechanically isolates the operation of the electrical apparatus to which the bus structure is electrically connected from the bus structure 20 in cooperation with the flexible conducting joint 38, the necessity for an additional flexible conducting joint on the other side of the sealing member 30 from the flexible conducting joint 38 is eliminated. Such an additional flexible conducting joint would be required in a conventional arrangement where a substantially rigid end closing member is employed. The applicant's disclosed construction also permits the flexible conducting joint 38 to be disposed inside the housing H1 so that the flexible conductors 36 included in the flexible conducting joint 38 are not subjected to the possibility of corrosion which may result in certain environmental conditions such as in salt air along a sea coast.

Referring now to FIGS. 3 and 4, there is illustrated a three-phase isolated phase bus structure 60 which may be employed to electrically interconnect an electrical apparatus, such as a generator or transformer as indicated at 40, and another electrical apparatus (not shown) or a source of electric power. The three phases of the bus structure 60 comprise the laterally spaced bus conductors C5, C6 and C7 and the associated housings H5, H6 and H7 for enclosing the conductors C5, C6 and C7, respectively. The conductors C5, C6 and C7 may be supported within the associated housings by suitable supporting means, such as the space insulating supports or insulators as described in detail in the previously mentioned copending application of Arthur B. Niemoller. The electrical apparatus 40 may include a metallic housing 52 which is normally maintained at ground or substantially zero potential. Each of the housings H5, H6 and H7 is mechanically connected to the housing 52 of the electrical apparatus 40 by a joint structure 50 which will be described in detail for the housing H5.

In order to hermetically seal off the space inside the housing H5 from the space inside the housing 52 of the electrical apparatus 40, the joint structure 50 includes a sealing member 30 which is identical to the sealing member previously described and is disposed to close off the opening between the bus conductor C5 and the associated housing H5.

In particular, the joint structure 50 includes a housing section 76 of larger cross-section or diameter than that of the housing H5 which telescopes over the adjacent ends of the housing section H5 and a tubular housing portion 82 which projects outwardly from the housing 52 of the electrical apparatus 40, as shown in FIG. 4. The spacing rings or bands 72 and 74 are disposed between the housing section 76 and the ends of the housing sections H5 and H2, respectively, with the spacing rings 72 and 74 being secured on the one hand to the associated housing sections H5 and 82, respectively by any suitable means, such as welding or brazing, and being secured on the other hand to the telescoping housing section 76 by any suitable means, such as welding or brazing as shown in FIG. 4. The inner periphery of the sealing member 30 around the central opening is rigidly secured to the tubular conductor C5 by a clamping band or ring 92 which is preferably formed from a non-magnetic material, such as aluminum or stainless steel to avoid hysteresis losses and reduce eddy current losses by any suitable means, such as the bolts or screws 94 which are spaced around the periphery of the bus conductor C5 and which pass through aligned openings in the clamping band 92 and the inner periphery of the sealing member 30. The inner periphery of the sealing member 30 may be similarly bonded or sealed to the bus conductor C5 by a sealing or bonding material, such as a silicone rubber compound. The outer periphery of the sealing member 30 which is substantially circular in configuration as illustrated is rigidly secured to the telescoping housing section 76 by a clamping band 84 which is disposed inside the telescoping housing section 76 and is preferably formed from a nonmagnetic material, such as aluminum, to avoid hysteresis losses and to reduce eddy current losses. The clamping band or ring 84 may be secured to the telescoping housing section 76 by a plurality of spaced bolts or screws 86 which pass through aligned openings provided in the housing section 76 and the clamping band 84 to threadably engage the clamping band 84, as shown in FIG. 4. In order to prevent the outer periphery or portion of the sealing member 30 from slipping out from between the clamping band 84 and the housing section 76, an additional clamping band or ring 78 may be disposed on the opposite side of the outer portion of the sealing member 30 from the clamping band 84, as shown in FIG. 4, and may be secured to the inside of telescoping housing section 76 by any suitable means, such as welding or brazing.

In the operation of the bus structure 60, each sealing member 30 hermetically isolates the cooling and insulating gas provided in the housing of the electrical apparatus 40 from the insulating fluid, such as air or other insulating gas which is provided in the housing sections H5, H6 and H7 and also provides a predetermined electrical creepage insulating distance between each housing and its associated bus conductor, as previously explained in connection with the bus structure 20, as each sealing member 30 flexes or changes shape during the operation of the bus structure 60 due to the thermal expansion and contraction of the bus conductors C5, C6 and C7 or their associated housings. The projection portions 24 and 26 of the sealing member 30 similarly remain substantially parallel as the included angle in the coaxial portions of the sealing member vary during the operation of the bus structure 60. In the bus structure 60, the sealing member or partition member 30 eliminates the necessity for a flexible conducting joint on at least one side of the flexible member 30 since the resilient properties of the material from which the sealing member 30 is formed permit limited relative movement of the bus conductors C5, C6 and C7 and the associated enclosing housing sections or joint structures. The sealing member 30 also eliminates the necessity of providing flexible housing connections between the housing of electrical apparatus 40 and the housings H5, H6 and H7, as required in certain conventional constructions.

As mentioned previously, the sealing member 30 as disclosed is preferably formed from a resilient, electrically insulating material, such as silicone rubber, which is particularly advantageous since silicone rubber is an extremely stable material at environmental temperatures of over 100° C. In addition, silicone rubber is recognized as a class H insulating material for use up to temperatures of 180° C. with an extremely long life. Silicone rubber also is a substantially non-wetting, electrically insulating material and when subjected to an arc, silicone rubber does not burn but forms an ash which is an electrically insulating material.

It is to be understood that a sealing member or flexible diaphragm as disclosed may be employed to seal off the interior of the housing in an enclosed bus structure from external environmental conditions, to seal off the space inside an enclosed bus structure from the space inside an associated electrical apparatus to which the bus structure is electrically connected or to seal off different portions of an enclosed bus structure from one another as required in various applications.

The apparatus embodying the teachings of this invention has several advantages. For example, a sealing member as disclosed assists in mechanically isolating an enclosed bus structure from an associated electrical apparatus to which the bus structure is electrically and structurally connected and provides a predetermined electrical insulating creepage distance which remains at a substantially predetermined value during the operation of the bus structure. In addition, the sealing member as disclosed eliminates the necessity for certain additional flexible conducting joints which would otherwise be required if the sealing member were formed as a rigid partition. Finally, a sealing member as disclosed provides an increased electrical insulating creepage distance between a bus conductor and its associated housing while still permitting relative movement of a bus conductor and the associated housing, such as results during the thermal expansion and contraction of the different portions of a bus structure or the associated electrical apparatus to which the bus structure may be electrically connected.

Since numerous changes may be made in the above described apparatus and different embodiments of the invention may be made without departing from the spirit and scope thereof, it is intended that all the matter con-

I claim as my invention:

1. A bus structure comprising an elongated bus conductor, a tubular housing spaced from and enclosing the bus conductor, a resilient diaphragm formed of electrically insulating material disposed generally perpendicular with respect to the conductor and extending between the conductor and the housing to seal off the space inside the housing on one side of the diaphragm from the space on the other side of the diaphragm, said diaphragm comprising a central portion which is generally sawtooth in cross-section and a plurality of spaced substantially parallel elongated portions formed integrally and alternately projecting axially from said central portion in opposite directions to provide a predetermined electrically insulating distance between the conductor and the housing.

2. A bus structure comprising an elongated bus conductor, a tubular housing spaced from and enclosing the bus conductor, a generally annular insulating resilient sealing member disposed at one end of the housing generally perpendicular to the bus conductor and extending between the bus conductor and the housing to close off the opening between the bus conductor and the housing, said sealing member having a central opening at the inner periphery which is secured to the bus conductor and an outer periphery which is secured to the housing, said sealing member being generally zig-zag in cross-section and including a plurality of spaced vertices alternately projecting in opposite directions generally parallel to the bus conductor and an elongated integral portion projecting away from each vertex generally parallel to the bus conductor to increase the insulating creepage distance between the bus conductor and the housing.

3. A bus structure comprising an elongated bus conductor, first and second aligned housing sections spaced from and enclosing the bus conductor with the adjacent ends of the housing sections spaced from one another, a third housing section of a relatively larger cross-section than the first and second housing sections disposed to telescope over the adjacent ends of the first and second housing sections and being secured thereto, a resilient partition member formed of electrically insulating material and disposed between the bus conductor and the third housing section to seal off the spaces in the first and second housing sections from one another, said partition member comprising a plurality of interconnected coaxial portions which are generally V-shaped in cross-section and alternately project in opposite directions away from a reference plane which is substantially perpendicular to the bus conductor and a plurality of spaced coaxial planar portions which are formed integrally with an alternately project away from the vertices of the V-shaped coaxial portions on the opposite sides of the reference plane, said planar portions disposed to remain substantially parallel to each other and to the bus conductor as the partition member flexes, and a pair of spaced clamping members securing the inner and outer portions of the partition member to the bus conductor and to the third housing section, respectively.

4. A bus structure comprising an elongated bus conductor, first and second aligned housing sections spaced from and enclosing the bus conductor with the adjacent ends of the housing sections spaced from one another, a third housing section of a relatively larger cross-section than the first and second housing sections disposed to telescope over the adjacent ends of the first and second housing sections and being secured thereto, a resilient partition member formed of electrically insulating material and disposed between the bus conductor and the third housing section to seal off the spaces in the first and second housing sections from one another, said partition member comprising a plurality of interconnected coaxial portions which are generally V-shaped in cross-section and alternately project in opposite directions away from a reference plane which is substantially perpendicular to the bus conductor and a plurality of spaced coaxial planar portions which are formed integrally with and alternately project away from the vertices of the V-shaped coaxial portions on the opposite sides of the reference plane, said planar portions disposed to remain substantially parallel to each other and to the bus conductor as the partition member flexes, and a pair of spaced clamping members securing the inner and outer portions of the partition member to the bus conductor and to the third housing section, respectively, and an additional clamping member secured to the inside of said third housing section on the opposite side of the partition member from one of said pair of clamping members to assist, in clamping the outer portion of said partition member to the third housing section.

5. A generally annular diaphragm having a central opening and comprising a plurality of successively interconnected coaxial portions extending generally radially outwardly from the central opening and alternately projecting in opposite directions away from a reference plane, each coaxial portion comprising first and second planar portions intersecting at an angle and a third integral planar portion projecting from the vertex of the intersecting angle of the first and second planar portions, the third planar portions of the respective coaxial portions remaining substantially parallel and substantially perpendicular to the reference plane as the intersecting angles of the associated planar portions may vary over a predetermined range, said diaphragm being formed from an electrically insulating, resilient material.

6. A generally annular diaphragm having a central opening and comprising a first portion which is disposed generally in a plane which is substantially perpendicular to a central axis and which extends generally radially outwardly from the central opening at the inner periphery to an outer periphery which is substantially parallel to the central opening, said first portion being formed from a resilient, electrically insulating material and having a generally sawtooth shape in cross-section to define a plurality of successive interconnected coaxial portions which alternately project in opposite directions from said plane, each coaxial portion including first and second planar portions meeting at an angle, and a plurality of integrally formed, spaced generally planar portions alternately extending away from said plane in opposite directions from the vertices of the angles of the respective coaxial portions substantially parallel to each other and to said central axis.

7. The combination as claimed in claim 3 wherein the partition member is formed from silicone rubber material.

8. The combination as claimed in claim 4 wherein the partition member is formed from silicone rubber material.

References Cited

UNITED STATES PATENTS

| | | | |
|---|---|---|---|
| 1,807,880 | 6/1931 | Skvotzoff | 74—18 |
| 2,383,018 | 8/1945 | Shere | 174—151 |
| 2,916,307 | 12/1959 | Peters | 285—299 X |
| 2,920,656 | 1/1960 | Bertolet | 285—226 X |
| 3,036,148 | 5/1962 | Swerdlow | 174—85 |
| 3,154,326 | 10/1964 | Anding | 285—299 X |
| 3,236,933 | 2/1967 | Frowein | 174—99 |

FOREIGN PATENTS

| | | |
|---|---|---|
| 1,296,056 | 5/1962 | France. |
| 1,364,705 | 5/1964 | France. |

LEWIS H. MYERS, *Primary Examiner.*

H. HUBERFELD, *Assistant Examiner.*